United States Patent
Tomatsu

(10) Patent No.: US 8,146,631 B2
(45) Date of Patent: Apr. 3, 2012

(54) PNEUMATIC TIRE AND METHOD OF PRODUCING THE SAME AS WELL AS TIRE CURING MOLD

(75) Inventor: Yuji Tomatsu, Hiratsuka (JP)

(73) Assignee: The Yokohama Rubber Co., Ltd., Tokyo (JP)

( * ) Notice: Subject to any disclaimer, the term of this patent is extended or adjusted under 35 U.S.C. 154(b) by 377 days.

(21) Appl. No.: 12/414,023

(22) Filed: Mar. 30, 2009

(65) Prior Publication Data

US 2009/0255616 A1 Oct. 15, 2009

(30) Foreign Application Priority Data

Apr. 15, 2008 (JP) ................................ 2008-105958

(51) Int. Cl.
- *B29C 33/42* (2006.01)
- *B29D 30/52* (2006.01)
- *B60C 11/12* (2006.01)

(52) U.S. Cl. ......... 152/209.21; 152/209.23; 152/209.28; 152/DIG. 3; 264/326; 425/28.1

(58) Field of Classification Search ............... 156/110.1; 264/326; 425/28.1; 152/209.21, 209.23, 152/209.28, DIG. 3
See application file for complete search history.

(56) References Cited

U.S. PATENT DOCUMENTS

| | | | |
|---|---|---|---|
| 5,711,828 A * | 1/1998 | Himuro | 152/DIG. 3 |
| 5,783,002 A * | 7/1998 | Lagnier | 152/DIG. 3 |
| 6,907,910 B2 * | 6/2005 | Iwamura | 152/DIG. 3 |
| 2007/0272337 A1 * | 11/2007 | Bovaird et al. | 425/28.1 |
| 2009/0000713 A1 * | 1/2009 | Stuhldreher | 425/28.1 |

FOREIGN PATENT DOCUMENTS

| | | |
|---|---|---|
| DE | 3118407 A1 * | 12/1982 |
| EP | 933235 A2 * | 8/1999 |
| JP | 2892030 | 5/1999 |
| JP | 3499995 | 2/2004 |
| JP | 2004-161166 A * | 6/2004 |
| JP | 2005-35342 | 2/2005 |
| JP | 3791926 | 6/2006 |

OTHER PUBLICATIONS

Machine translation for Japan 2004-161166 (no date).* Machine translation for German 3,118,407 (no date).*

* cited by examiner

*Primary Examiner* — Steven D Maki
(74) *Attorney, Agent, or Firm* — Greer, Burns & Crain, Ltd.

(57) ABSTRACT

Provided are a pneumatic tire, a method of producing the pneumatic tire, and a tire curing mold, with which decrease in wet performance of a pneumatic tire in a worn state can be effectively prevented while chipping of land portions such as blocks is prevented in releasing the tire from a mold. The pneumatic tire of the present invention includes: a tread portion provided with groove portions and land portions; and sipes provided in the land portions. Each of the sipes has at least one end, in a longitudinal direction, being terminated within the corresponding land portion. Each sipe is provided with: a first offset portion protruding toward one side in a sipe thickness direction; and a second offset portion protruding toward the other side in the sipe thickness direction at a position on an inner side, in a tire radial direction, of a position at which the first offset portion protrudes. For each sipe, a sipe length (L2) in a worn state is set to be substantially the same as a sipe length (L1) in an original state, and a sipe path length (M2) in the worn state is set to be larger than a sipe path length (M1) in the original state. The method of producing a pneumatic tire of the present invention and the tire curing mold are used for producing the pneumatic tire.

9 Claims, 5 Drawing Sheets

PNEUMATIC TIRE AND METHOD OF PRODUCING THE SAME AS WELL AS TIRE CURING MOLD

BACKGROUND OF THE INVENTION

1. Field of the Invention

The present invention relates to a pneumatic tire having sipes formed in land portions of a tread portion, a method of producing the pneumatic tire and a tire curing mold. More particularly, the present invention relates to a pneumatic tire, a method of producing the pneumatic tire, and a tire curing mold, with which decrease in wet performance of a pneumatic tire in a worn state can be effectively prevented while chipping of land portions such as blocks is prevented in releasing the tire from a mold.

2. Description of the Related Art

Conventionally, in order to improve the wet performance of a pneumatic tire, the pneumatic tire is provided with sipes formed in land portions such as blocks defined in a tread portion. These sipes are generally formed with blades implanted in an inner surface of a mold so as to have the same plan-view shape in an original state as in an expected worn state. For this reason, as the wear of the tire progresses, the wet performance of the tire tends to decrease because of degradation of rubber and increase in stiffness of the land portions such as blocks, both associated with the wear, although edge effects attributable to the sipes are maintained.

Here, for example, Japanese patent Nos. 2892030, 3499995, 3791926, and Japanese patent application Kokai publication No. 2005-35342 propose techniques for preventing decrease in wet performance in a worn state. In these techniques, each sipe has a linear shape on the tread surface, while the sipe has a wavy or zigzag shape on the bottom side of the sipe to thereby gradually increase the sipe path length toward the bottom side of the sipe.

However, all of such conventional sipes that have the linear shape on the tread surface while having the wavy or zigzag shape on the bottom side have the following disadvantages. Specifically, for example, when each of the sipes is provided across a block, the decrease in stiffness of the block is significant, thereby causing an insufficient wet performance in an original state and in a worn state. Meanwhile, if the sipe length is designed so as to be larger in a worn state than in an original state, blades bite into blocks in releasing the tire from a mold, thereby causing chipping of the blocks to be more likely to occur. On the other hand, if the sipe length is designed so as to be smaller in a worn state than in an original state, an effect to prevent decrease in wet performance in a worn state becomes insufficient. In addition, when the sipes have a shape in which the sipes protrude toward only one side in the sipe thickness direction on the bottom side of the sipe, stress is concentrated in only rubber portions each located on one side of a blade in releasing the tire from a mold, thereby causing chipping of blocks to be more likely to occur.

SUMMARY OF THE INVENTION

An object of the present invention is to provide a pneumatic tire, a method of producing the pneumatic tire, and a tire curing mold, with which decrease in wet performance of a pneumatic tire in a worn state can be effectively prevented while chipping of land portions such as blocks is prevented in releasing the tire from a mold.

A pneumatic tire of the present invention to achieve the above object includes: a tread portion provided with groove portions and land portions; and sipes provided in the land portions. Each of the sipes has at least one end, in a longitudinal direction, being terminated within the corresponding land portion. Each sipe is provided with: a first offset portion protruding toward one side in a sipe thickness direction; and a second offset portion protruding toward the other side in the sipe thickness direction at a position on an inner side, in a tire radial direction, of a position at which the first offset portion protrudes. For each sipe, a sipe length (L2) in a worn state is set to be substantially the same as a sipe length (L1) in an original state, and a sipe path length (M2) in the worn state is set to be larger than a sipe path length (M1) in the original state.

A method of producing a pneumatic tire of the present invention to achieve the above object is a method of producing a pneumatic tire using a tire curing mold, the tire curing mold including blades for forming sipes in land portions of a tread portion of a pneumatic tire, in which each of the blades has at least one end, in a longitudinal direction, being terminated within a molding space for molding the corresponding land portion. Each blade is provided with: a first offset portion protruding toward one side in a blade thickness direction; and a second offset portion protruding toward the other side in the blade thickness direction at a position on an inner side, in a mold radial direction, of a position at which the first offset portion protrudes. For each blade, a blade length (L2) at a position on an inner side, in the mold radial direction, of a position corresponding to a tire tread surface is set to be substantially the same as a blade length (L1) at the position corresponding to the tire tread surface, and a blade path length (M2) at the position on an inner side, in the mold radial direction, of a position corresponding to a tire tread surface is set to be larger than a blade path length (M1) at the position corresponding to the tire tread surface. The method includes the steps of: forming a green tire; loading the green tire into the tire curing mold; inflating the green tire so as to bring the green tire in contact with an inner surface of the tire curing mold; and heating the green tire to cure the green tire.

A tire curing mold of the present invention to achieve the above object includes blades for forming sipes in land portions of a tread portion of a pneumatic tire. Each of the blades has at least one end, in a longitudinal direction, being terminated within a molding space for molding the corresponding land portion. Each blade is provided with: a first offset portion protruding toward one side in a blade thickness direction; and a second offset portion protruding toward the other side in the blade thickness direction at a position on an inner side, in a mold radial direction, of a position at which the first offset portion protrudes. For each blade, a blade length (L2) at a position on an inner side, in the mold radial direction, of a position corresponding to a tire tread surface is set to be substantially the same as a blade length (L1) at the position corresponding to the tire tread surface, and a blade path length (M2) at the position on an inner side, in the mold radial direction, of a position corresponding to a tire tread surface is set to be larger than a blade path length (M1) at the position corresponding to the tire tread surface.

In the pneumatic tire of the present invention, at least one end of each of the sipes in the longitudinal direction is terminated within the land portion. Thus, excessive decrease in stiffness of the land portions such as blocks can be suppressed, and accordingly good wet performances in an original state and in a worn state can be ensured. Furthermore, the sipe length (L2) in the worn state is set to be substantially the same as the sipe length (L1) in the original state, whereas the sipe path length (M2) in the worn state is set to be larger than the sipe path length (M1) in the original state. As a result, the sipe path length increases as the wear of the tire progresses, and thereby decrease in wet performance in the worn state can be suppressed effectively. In addition, when the sipe length (L2) in the worn state is set to be substantially the same as the sipe length (L1) in the original state, chipping of land portions such as blocks is less likely to occur in releasing the tire from a mold. Furthermore, the sipes are provided with the first offset portions protruding toward the one side in the sipe thickness direction and the second offset portions protruding toward the other side in the sipe thickness direction at a position on the inner side, in the tire radial direction of a position at which the first offset portions protrudes. Thus, stress generated in releasing the tire from a mold is dispersed to rubber portions located on both sides of a sipe-forming blade, whereby chipping of the land portions such as blocks can be avoided.

In the pneumatic tire of the present invention, the maximum value of the sipe path length (M2) in the worn state is preferably set to be 110% to 150% of the sipe path length (M1) in the original state. Accordingly, decrease in wet performance in a worn state can be effectively suppressed while chipping of land portions such as blocks is prevented in releasing the tire from a mold.

In addition, each of the sipes is preferably formed so that some portions of the sipe in the worm state extend in parallel with the sipe in the original state when viewed in a plan view, and a total length (P2) of the parallel portions is preferably set to be 20% to 80% of the sipe length (L1) in the original state. This suppresses formation of cracks in the sipes, while an excellent edge effect can be ensured.

As described above, the method of producing a pneumatic tire of the present invention is a method of producing the pneumatic tire including the sipes which have the specific structure and which are provided in the land portions of the tread portion. Meanwhile, the tire curing mold of the present invention is used in producing the aforementioned pneumatic tire. Here, for the same reasons as those described above, the maximum value of the blade path length (M2) at a position located inside the tire tread surface in the mold radial direction is preferably set to be 110% to 150% of the blade path length (M1) corresponding to the tire tread surface. In addition, each of the blades is preferably formed so that some portions of the blade at positions located inside the tire tread surface in the mold radial direction extend in parallel with the blade at the position corresponding to the tire tread surface when viewed in a plan view, and a total length (P2) of the parallel portions is preferably set to be 20% to 80% of the blade length (L1) at the position corresponding to the tire tread surface.

DETAILED DESCRIPTION OF THE PREFERRED EMBODIMENT

Figure 1:
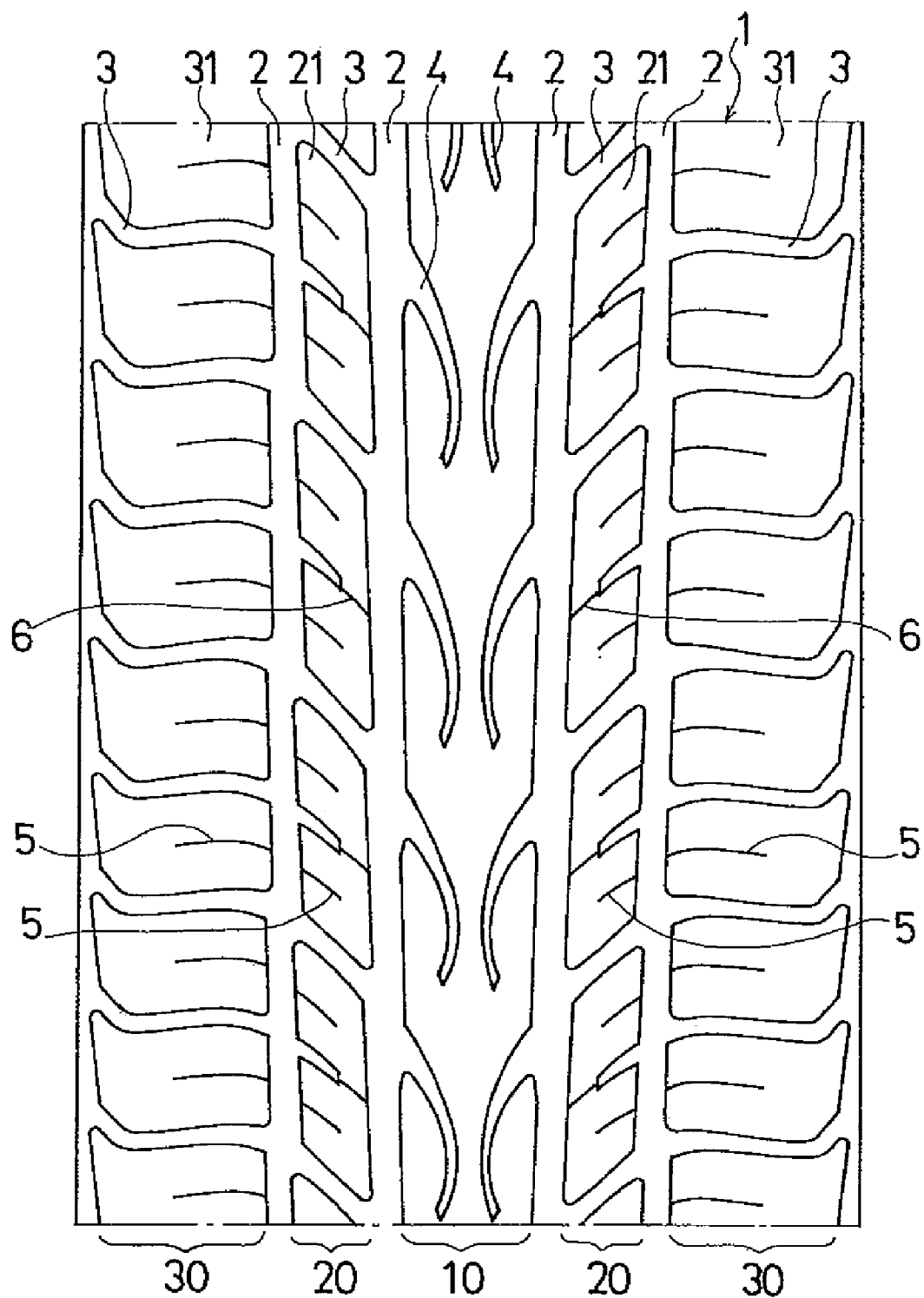
FIG. 1 is a development view showing a tread pattern of a pneumatic tire according to an embodiment of the present invention.

Hereinafter, a configuration of the present invention is described in details with reference to the accompanying drawings. FIG. 1 is a development view showing a tread pattern of a pneumatic tire according to an embodiment of the present invention. As shown in FIG. 1, a tread portion 1 includes: four main grooves 2 extending in the tire circumferential direction; and multiple lateral grooves 3 extending in the tire width direction. These main grooves 2 and lateral grooves 3 define a rib 10, block rows 20, and block rows 30. The rib 10 is located at the center of the tread portion 1 and continuously extends in the tire circumferential direction. The block rows 20 are located on outer sides, in the tire width directions, of the rib 10 and each include multiple blocks 21. The block rows 30 are located on outer sides, in the tire width directions, of the block rows 20 and each include multiple blocks 31.

The rib 10 include multiple curved grooves 4 each extending in the tire circumferential direction with some inclination. One end of each of the curved grooves 4 is terminated within the rib, whereas the other end of each of the curved grooves 4 is open to the main groove 2. Meanwhile, in the blocks 21 and 31, sipes 5 extending in substantially parallel with the lateral grooves 3. One end of each of the sipes 5 is terminated within the block 21 or 31, whereas the other end of each of the sipes 5 is open to the main groove 2. Additionally, each of the blocks 21 also includes a sipe 6. One end of the sipe 6 is open to the lateral groove 3, and the other end of the sipe 6 is open to the main groove 2.

The present invention specifies a sipe structure for such a pneumatic tire including the tread portion provided with the groove portions and the land portions as described above. Note that specific shapes and arrangement of the groove portions and land portions are not particularly limited, and various tread patterns can be adopted. Meanwhile, the sipe structure according to the present invention is preferably applied to all sipes in a tire; however, the sipe structure can be applied to a part of the sipes in a tire.

Figure 2:
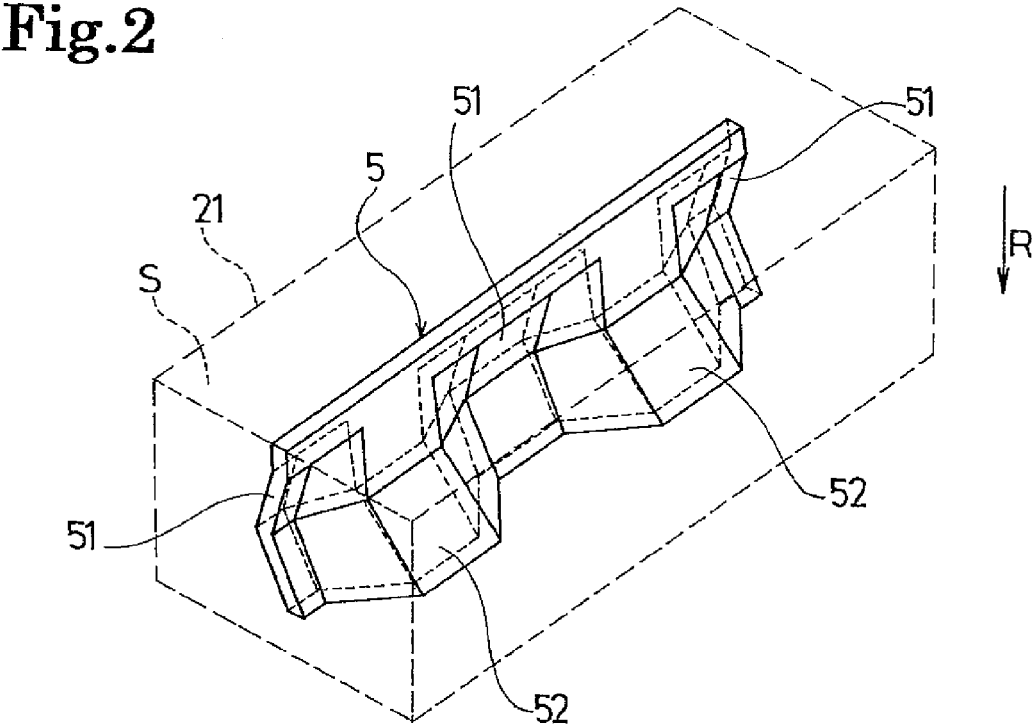
FIG. 2 is a perspective view showing the structure of a sipe in a land portion of a pneumatic tire of the present invention.
Figure 3:
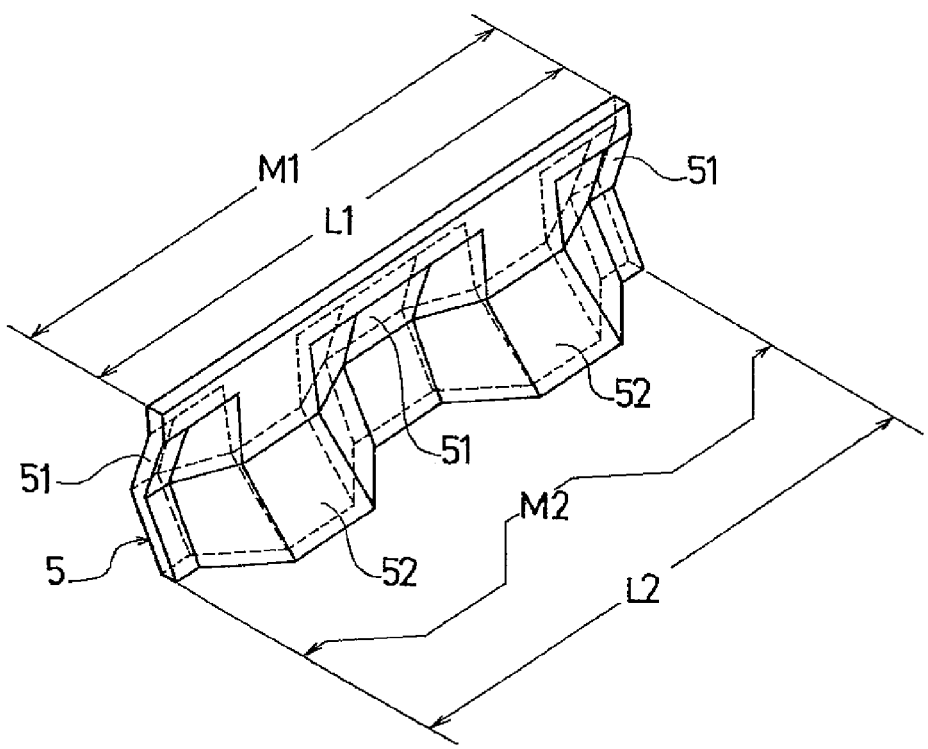
FIG. 3 is a perspective view showing the sipe in FIG. 2 alone.
Figure 4:
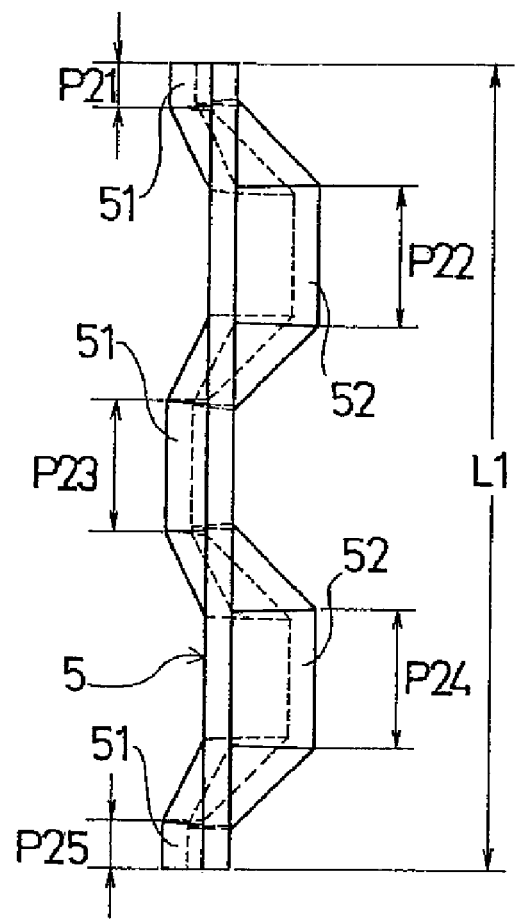
FIG. 4 is plan view showing the sipe in FIG. 2 alone.
Figure 5:
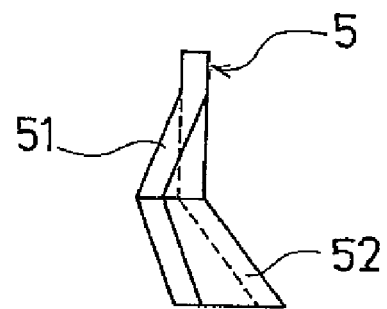
FIG. 5 is a side view showing the sipe in FIG. 2 alone.

FIG. 2 is a perspective view showing the structure of a sipe in a land portion of a pneumatic tire of the present invention. FIG. 3 is a perspective view showing the sipe in FIG. 2 alone. FIG. 4 is plan view showing the sipe in FIG. 2 alone. FIG. 5 is a side view showing the sipe in FIG. 2 alone. As shown in FIGS. 2 to 5, the sipe 5 has at least one end terminated within the block 21 and includes first offset portions 51 and second offset portions 52. Each of the first offset portions 51 protrudes toward one side in the sipe thickness direction. Each of the second offset portions 52 protrudes toward the other side in the sipe thickness direction at a position on an inner side, in the tire radial direction R, of a position at which the first offset portion 51 protrudes.

To be more specific, the first offset portions 51 are located at the center and at both ends in the longitudinal direction of the sipe 5, when viewed from above. When viewed from the side, each of the first offset portions 51 is inclined to one side in the sipe thickness direction relative to the tire radial direction R, from a point closer to the position of a tire tread surface S in an original state to the halfway point in the sipe depth direction, and is inclined to the other side in the sipe thickness direction relative to the tire radial direction R from the halfway point in the sipe depth direction to the bottom of the sipe 5. By contrast, each of the second offset portions 52 is located between the first offset portions 51, when viewed from above. Each of the second offset portions 52 extends in parallel with the tire radial direction R from a point closer to the position of a tire tread surface S in the original state to the halfway point in the sipe depth direction, and extends, with an inclination to the other side in the sipe thickness direction relative to the tire radial direction R, from the halfway point in the sipe depth direction to the bottom of the sipe 5.

Here, the sipe length (L2) assumed in a worn state is set substantially the same as the sipe length (L1) in the original state. The sipe length (L1) in the original state represents the distance between ends of the sipe on the tire tread surface in the original state. By contrast, the sipe length (L2) in the worn state represents the distance between ends of the sipe on the tire tread surface in the worn state. The sipe lengths L1 and L2 are preferably the same. However, if the error of the sipe length L2 relative to the sipe length L1 is 5% or less, the sipe lengths L1 and L2 can be regarded as substantially the same, because there arises no practical difference.

The sipe path length (M2) assumed in the worn state is set to be larger than the sipe path length (M1) in the original state. The sipe path length (M1) in the original state represents the path length between ends of the sipe on the tire tread surface in the original state. By contrast, the sipe path length (M2) in the worn state represents the path length between ends of the sipe on the tire tread surface in the worn state. The maximum value of the sipe path length (M2) in the worn state is set to be 110% to 150% of the sipe path length (M1) in the original state. If the maximum value of the sipe path length (M2) falls below 110% of the sipe path length (M1) in the original state, the effect to prevent the decrease in wet performance in the worn state becomes insufficient. On the other hand, if the maximum value of the sipe path length (M2) exceeds 150% of the sipe path length (M1) in the original state, chipping of the land portions such as block is more likely to occur in releasing the tire from a mold.

In the above pneumatic tire, at least one end of each of the sipes 5 in the longitudinal direction is terminated within the land portion. Thus, excessive decrease in stiffness of the land portions such as blocks can be prevented, and therefore good wet performances in the original state and in the worn state can be ensured. Furthermore, the sipe length (L2) in the worn state is set to be substantially the same as the sipe length (L1) in the original state, whereas the sipe path length (M2) in the worn state is set to be larger than the sipe path length (M1) in the original state. As a result, the sipe path length increases as the wear of the tire progresses, and therefore decrease in wet performance in the worn state can be effectively suppressed. In addition, when the sipe length (L2) in the worn state is set to be substantially the same as the sipe length (L1) in the original state, chipping of the land portions such as blocks is less likely to occur in releasing the tire from a mold. Moreover, the sipe 5 is provided with the first offset portions 51 protruding toward the one side in the sipe thickness direction and the second offset portions 52 protruding toward the other side in the sipe thickness direction at a position on the inner side, in the tire radial direction R, of a position at which the first offset portion 51 protrudes. Thus, stress generated in releasing the tire from a mold is dispersed to rubber portions located on both sides of a sipe-forming blade, whereby the chipping of the land portions such as blocks can be avoided.

In the above pneumatic tire, some portions of the sipe in the worm state extend in parallel with the sipe 5 in the original state, in a plan view. As shown in FIG. 4, five parallel portions have lengths of P21, P22, P23, P24, and P25, respectively. The total length (P2) of the parallel portions, which is the sum of these lengths P21 to P25, is set to be 20% to 80% of the sipe length (L1) in the original state. If the total length (P2) of the parallel portions is out of the above range, the curve of the sipe when viewed from above becomes too steep, whereby cracks are more likely to occur and good edge effect cannot be obtained. In particular, when the sipe 5 in the worm state has a larger proportion of the portions that extend in parallel with the sipe 5 in the original state when viewed in a plan view, a sipe edge extending direction designed in the original state can be maintained as much as possible.

Figure 6:
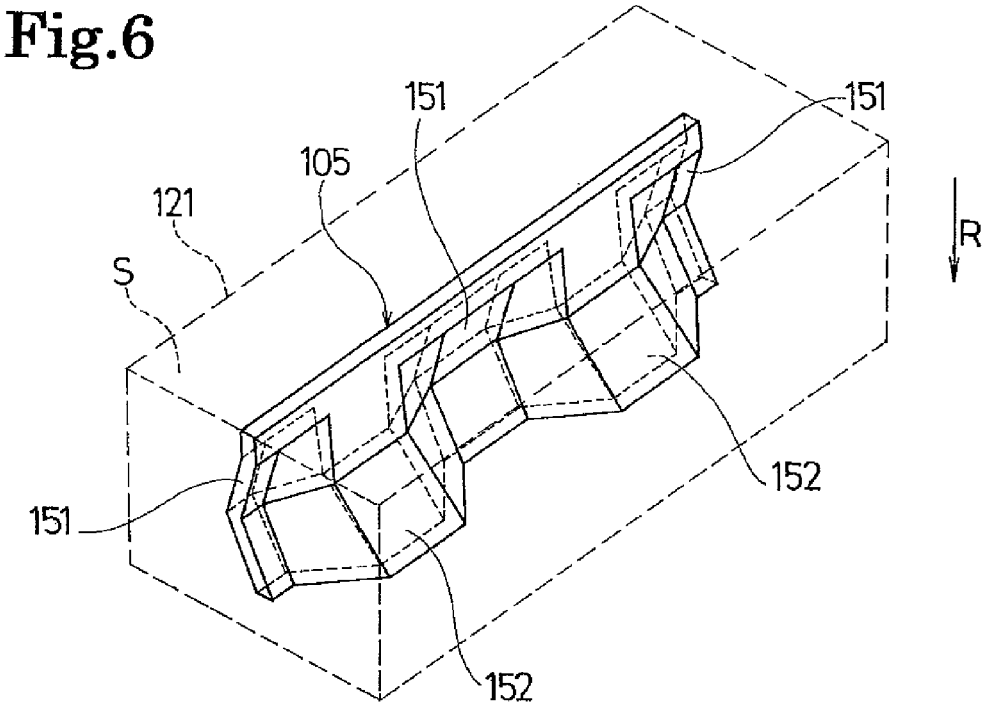
FIG. 6 is a perspective view showing the structure of a blade in a molding space for a land portion in a tire curing mold of the present invention.
Figure 7:
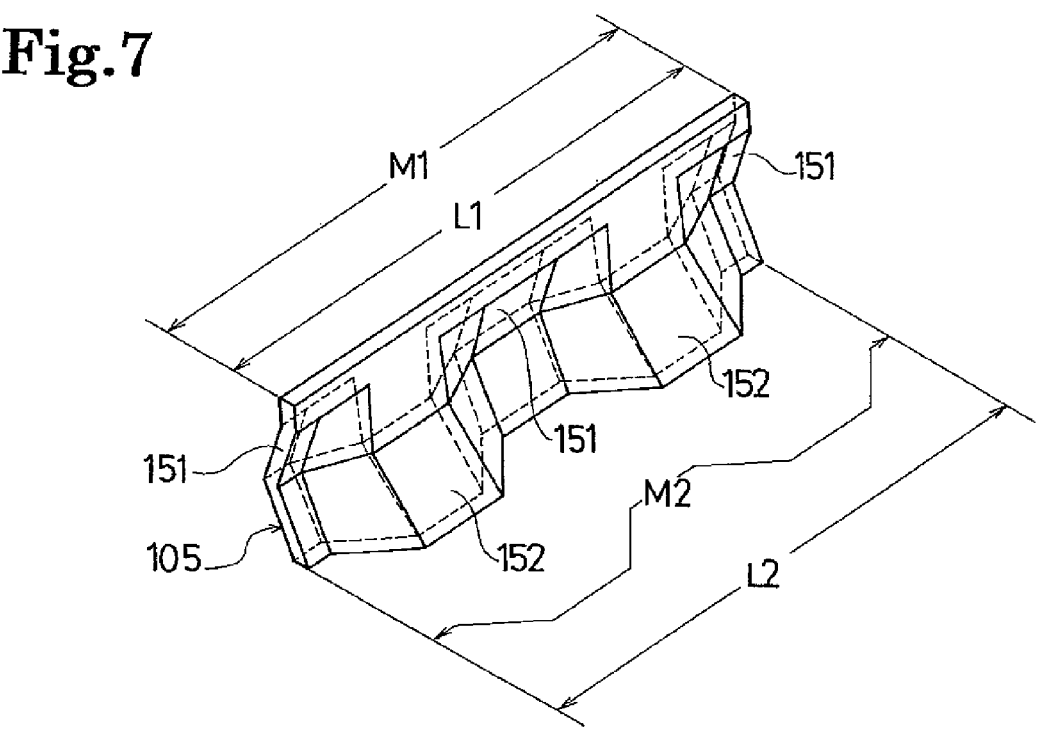
FIG. 7 is a perspective view showing the blade in FIG. 6 alone.
Figure 8:
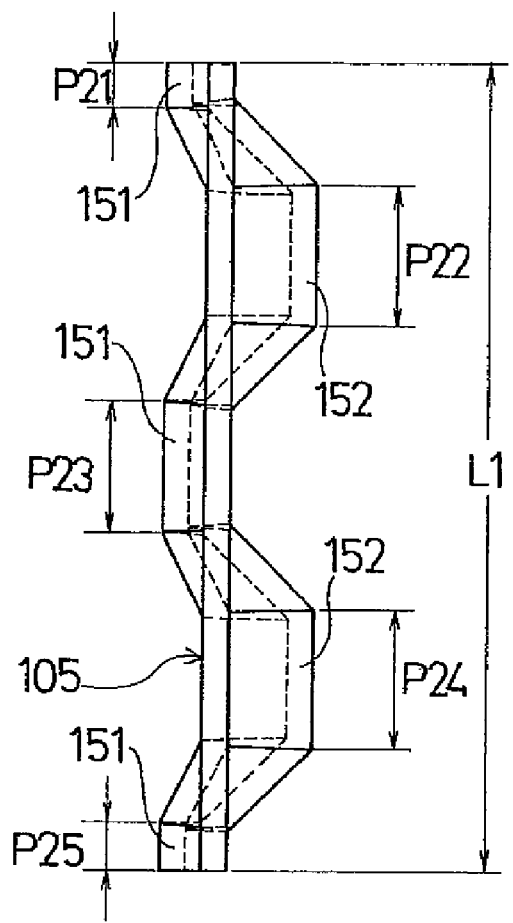
FIG. 8 is a plan view showing the blade in FIG. 6 alone.
Figure 9:
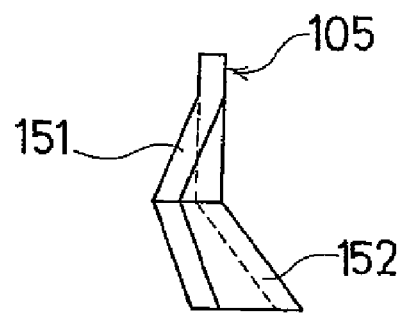
FIG. 9 is a side view showing the blade in FIG. 6 alone.

FIG. 6 is a perspective view showing the structure of a blade in a molding space for a land portion in a tire curing mold of the present invention. FIG. 7 is a perspective view showing the blade in FIG. 6 alone. FIG. 8 is a plan view showing the blade in FIG. 6 alone. FIG. 9 is a side view showing the blade in FIG. 6 alone. As shown in FIGS. 6 to 9, a blade 105 has at least one end terminated within a molding space 121 for molding a block and includes first offset portions 151 and second offset portions 152. Each of the first offset portions 151 protrudes toward one side in the blade thickness direction. Each of the second offset portions 152 protrudes toward the other side in the blade thickness direction at a position on an inner side, in the mold radial direction R, of a position at which the first offset portion 151 protrudes. The blade 105 is used for forming the aforementioned sipe 5, and has a structure which is an inversion of the structure of the sipe 5.

To be more specific, the first offset portions 151 are located at the center and at both ends in the longitudinal direction of the blade 105, when viewed from above. Each of the first offset portions 151 is inclined to one side in the blade thickness direction relative to the mold radial direction R, from a point closer to the position of a tire tread surface S in the original state to the halfway point in the sipe depth direction, and inclined to the other side in the blade thickness direction relative to the mold radial direction R from the halfway point in the sipe depth direction to the bottom of the sipe 5. By contrast, each of the second offset portions 152 is located between the first offset portions 151, when viewed from above. The second offset portion 152 extends in parallel with the mold radial direction R from the point closer to the position of a tire tread surface S in the original state to the halfway point in the sipe depth direction, and extends, with an inclination to the other side in the blade thickness direction relative to the mold radial direction R, from the halfway point in the sipe depth direction to the bottom of the sipe 5.

Here, the blade length (L2) at a position located inside the tire tread surface S in the mold radial direction R is set to be substantially the same as the blade length (L1) at a position corresponding to the tire tread surface S. The blade length (L1) at the position corresponding to the tire tread surface S equals to the sipe length in the original state. Meanwhile, the blade length (L2) at the position located inside the tire tread surface S in the mold radial direction R equals to the sipe length in a worn state.

The blade path length (M2) at the position located inside the tire tread surface S in the mold radial direction R is set to be larger than the blade path length (M1) at the position corresponding to the tire tread surface S. The blade path length (M1) at the position corresponding to the tire tread surface S equals to the sipe path length in the original state. Meanwhile, the blade path length (M2) at the position located inside the tire tread surface S in the mold radial direction R equals to the sipe path length in a worn state. The maximum value of the blade path length (M2) at positions located inside the tire tread surface S in the mold radial direction R is set to be 110% to 150% of the blade path length (M1) at the position corresponding to the tire tread surface S.

In addition, the blade 105 is formed so that the portions at a position on an inner side, in the mold radial direction R, of a position corresponding to a tire tread surface S are parallel with the blade 105 at the position corresponding to the tire tread surface S when viewed in a plan view. As shown in FIG. 8, five parallel portions have lengths of P21, P22, P23, P24, and P25, respectively. The total length (P2) of the parallel portions, which is the sum of these lengths P21 to P25, is set to be 20% to 80% of the blade length (L1) at the position corresponding to the tire tread surface S.

A pneumatic tire may be produced by use of the above tire curing mold as follows. A green tire is formed, and then loaded into the tire curing mold. Subsequently, the green tire is inflated so as to abut on the inner surface of the tire curing mold. Thereafter, the green tire is heated to be cured. Thus, a pneumatic tire with the above sipe structure described above can be produced.

Hereinabove, the preferred embodiment of the present invention has been described in details. However, it should be understood that various changes, substitutions and replacements can be made to the present invention without departing from the spirit and the scopes of the present invention which is defined by the appended scope of claims.

Examples

Tires of Examples 1 to 4 having the following structure were prepared (refer to FIG. 1). Specifically, each of the tires used was a pneumatic tire having a tire size of 215/60R16 and including: a tread portion provided with groove portions and land portions; and sipes provided in the land portions. In each of the tires, one end of each of the sipes in the longitudinal direction was terminated within the land portion. First offset portions were provided in each of the sipes so as to protrude toward one side in the sipe thickness direction. Second offset portions were provided in each of the sipes so as to protrude toward the other side in the sipe thickness direction at a position on an inner side, in the tire radial direction, of a position at which the first offset portion protrudes. The sipe length (L2) in the worn state was set to the same as the sipe length (L1) in the original state, whereas the sipe path length (M2) in the worn state is set to larger than the sipe path length (M1) in the original state. Table 1 shows the relationships between these lengths in each Example.

For the purpose of comparison, tires of Comparative Examples 1 to 4 were prepared. Each of the tires of Comparative Examples 1 to 4 had the same tire size of those in Examples 1 to 4 and had a structure mentioned below. In the tires of Comparative Example 1, both ends of each sipe in longitudinal direction were open to main grooves; each of the sipes had a linear shape in the original state, and had a wavy shape in the expected worn state; the sipe length (L2) in the worn state was set to be the same as the sipe length (L1) in the original state; and the sipe path length (M2) in the worn state was set to be larger than the sipe path length (M1) in the original state.

In the tires of Comparative Example 2, one end of each sipes in the longitudinal direction was terminated within a land portion; each of the sipes had a linear shape in the original state, and had a wavy shape in the worn state; the sipe length (L2) in the worn state was set to be larger than the sipe length (L1) in the original state; and the sipe path length (M2) in the worn state was set to be larger than the sipe path length (M1) in the original state.

In the tires of Comparative Example 3, both ends of each sipe in longitudinal direction were terminated within a land portion; each of the sipes had a linear shape in the original state, and had a zigzag shape in the worn state; the sipe length (L2) in the worn state was set to be smaller than the sipe length (L1) in the original state; and the sipe path length (M2) in the worn state was set to be larger than the sipe path length (M1) in the original state.

In the tires of Comparative Example 4, one end of each sipes in the longitudinal direction was terminated within a land portion; each of the sipes had a linear shape in the original state, and had a zigzag shape in the worn state; the sipe length (L2) in the worn state was set to be the same as the sipe length (L1) in the original state; and the sipe path length (M2) in the worn state was set to be larger than the sipe path length (M1) in the original state. Note that, in Comparative Example 4, zigzag portions in the sipes were offset to only one side in the sipe thickness direction.

These tires were evaluated in terms of the wet performance and curing failure by the following evaluation method. Table 1 also shows the results.

Wet Performance:

The test tires were mounted on wheels each having a rim size of 16×6.5 J, mounted onto a test vehicle, and inflated to obtain an air pressure of 200 kPa. Then, sensory evaluations of the tires were conducted on a wet road surface. The test results are shown by use of indices with the result of Comparative Example 1 taken as 100. A larger value of this index means more excellent wet performance. The evaluation of the wet performances was conducted with tires in the original state and with tires after 30000 miles of use on an ordinary road.

Curing Failure:

One hundred test tires were produced in each of Examples and Comparative Examples. In the production, the presence or absence of a curing failure such as a chipped block was examined. A case where a curing failure was observed is represented as "present", and a case where no curing failure was observed at all is represented as "absent."

TABLE 1

|  | Comparative Example 1 | Comparative Example 2 | Comparative Example 3 | Comparative Example 4 | Example 1 | Example 2 | Example 3 | Example 4 |
| --- | --- | --- | --- | --- | --- | --- | --- | --- |
| Sipe length L2 in the worn state | L1 × 1.00 | L1 × 1.10 | L1 × 0.90 | L1 × 1.00 | L1 × 1.00 | L1 × 1.00 | L1 × 1.00 | L1 × 1.00 |
| Sipe path length M2 in the worn state | M1 × 1.10 | M1 × 1.15 | M1 × 1.05 | M1 × 1.10 | M1 × 1.05 | M1 × 1.10 | M1 × 1.20 | M1 × 1.30 |
| Offset direction of the sipes | Both sides | Both sides | Both sides | One side | Both sides | Both sides | Both sides | Both sides |
| Wet performance in the original state (index) | 100 | 105 | 105 | 105 | 105 | 105 | 105 | 105 |

TABLE 1-continued

|  | Comparative Example 1 | Comparative Example 2 | Comparative Example 3 | Comparative Example 4 | Example 1 | Example 2 | Example 3 | Example 4 |
|---|---|---|---|---|---|---|---|---|
| Wet performance in the worn state (index) | 100 | 105 | 103 | 105 | 105 | 110 | 115 | 120 |
| Curing failure | Absent | Present | Absent | Present | Absent | Absent | Absent | Absent |

As is clear from Table 1, the tires of Examples 1 to 4 all showed excellent wet performance both in the original state and in the worn state, and had no curing failure such as a chipped block. By contrast, the tires of Comparative Examples 1 and 3 showed insufficient wet performance in the worn state and some of the tires of both Comparative Examples 2 and 4 had curing failure such as a chipped block.

What is claimed is:

1. A pneumatic tire comprising:
a tread portion provided with groove portions and land portions; and
sipes provided in the land portions, wherein
each of the sipes has at least one end in a longitudinal direction being terminated within the corresponding land portion,
each sipe is provided with first offset portions protruding toward one side in a sipe thickness direction; and second offset portions protruding toward the other side in the sipe thickness direction at a position on an inner side, in a tire radial direction, of a position at which the first offset portions protrude,
the first offset portions are located at the center and at both ends in the longitudinal direction of the sipe when viewed from above, when viewed from the side each of the first offset portions is inclined to one side in the sipe thickness direction relative to the tire radial direction, from a point closer to the position of a tire tread surface in an original state to the halfway point in the sipe depth direction, and is inclined to the other side in the sipe thickness direction relative to the tire radial direction from the halfway point in the sipe depth direction to the bottom of the sipe,
each of the second offset portions is located between the first offset portions when viewed from above, when viewed from the side each of the second offset portions extends in parallel with the tire radial direction from a point closer to the position of a tire tread surface in the original state to the halfway point in the sipe depth direction, and extends with an incline to the other side in the sipe thickness direction relative to the tire radial direction, from the halfway point in the sipe depth direction to the bottom of the sipe, wherein
based on the shapes of the first offset portions and the second offset portions, a sipe path length (M2) in a worn state is set to be maximum value at the bottom of the sipe, and
for each sipe, a sipe length (L2) in a worn state is set to be substantially the same as a sipe length (L1) in an original state, and a sipe path length (M2) in the worn state is set to be larger than a sipe path length (M1) in the original state.

2. The pneumatic tire according to claim 1, wherein the maximum value of the sipe path length (M2) in a worn state is set to be 110% to 150% of the sipe path length (M1) in the original state.

3. The pneumatic tire according to claim 1, wherein
each of the sipes is formed so that some portions of the sipe in the worn state extend in parallel with the sipe in the original state when viewed in a plan view, and
a total length (P2) of the parallel portions is set to be 20% to 80% of the sipe length (L1) in the original state.

4. A method of producing a pneumatic tire using a tire curing mold, the tire curing mold including blades for forming sipes in land portions of a tread portion of a pneumatic tire, in which
each of the blades has at least one end, in a longitudinal direction, being terminated within a molding space for molding the corresponding land portion,
each blade is provided with first offset portions protruding toward one side in a blade thickness direction; and second offset portions protruding toward the other side in the blade thickness direction at a position on an inner side, in a mold radial direction, of a position at which the first offset portions protrude,
the first offset portions are located at the center and at both ends in the longitudinal direction of the blade when viewed from above, when viewed from the side each of the first offset portions is inclined to one side in the blade thickness direction relative to the mold radial direction from a point closer to the position of a tire tread surface in the original state to the halfway point in the sipe depth direction, and is inclined to the other side in the blade thickness direction relative to the mold radial direction from the halfway point in the sipe depth direction to the bottom of the sipe,
each of the second offset portions is located between the first offset portions when viewed from above, when viewed from the side each of the second offset portions extends in parallel with the mold radial direction from the point closer to the position of a tire tread surface in the original state to the halfway point in the sipe depth direction, and extends with an incline to the other side in the blade thickness direction relative to the mold radial direction, from the halfway point in the sipe depth direction to the bottom of the sipe, wherein
based on the shapes of the first offset portions and the second offset portions, a blade path length (M2) at a position located inside the tire tread surface in the mold radial direction is set to be maximum value at the bottom of the sipe, and
for each blade, a blade length (L2) at a position on an inner side, in the mold radial direction, of a position corresponding to a tire tread surface is set to be substantially the same as a blade length (L1) at the position corresponding to the tire tread surface, and a blade path length (M2) at the position on an inner side, in the mold radial direction, of a position corresponding to a tire tread surface is set to be larger than a blade path length (M1) at the position corresponding to the tire tread surface, the method comprising the steps of:
forming a green tire;
loading the green tire into the tire curing mold;

inflating the green tire so as to bring the green tire in contact with an inner surface of the tire curing mold; and heating the green tire to cure the green tire.

5. The method of producing a pneumatic tire according to claim 4, wherein the maximum value of the blade path length (M2) at a position located inside the tire tread surface in the mold radial direction is set to be 110% to 150% of the blade path length (M1) at the position corresponding to the tire tread surface.

6. The method of producing a pneumatic tire according to claim 4, wherein each of the blades is formed so that some portions of the blade at positions located inside the tire tread surface in the mold radial direction extend in parallel with the blade at the position corresponding to the tire tread surface when viewed in a plan view, and a total length (P2) of the parallel portions is set to be 20% to 80% of the blade length (L1) at the position corresponding to the tire tread surface.

7. A tire curing mold comprising blades for forming sipes in land portions of a tread portion of a pneumatic tire, wherein each of the blades has at least one end, in a longitudinal direction, being terminated within a molding space for molding the corresponding land portion;

each blade is provided with first offset portions protruding toward one side in a blade thickness direction; and second offset portions protruding toward the other side in the blade thickness direction at a position on an inner side, in a mold radial direction, of a position at which the first offset portions protrude, the first offset portions are located at the center and at both ends in the longitudinal direction of the blade when viewed from above, when viewed from the side each of the first offset portions is inclined to one side in the blade thickness direction relative to the mold radial direction from a point closer to the position of a tire tread surface in the original state to the halfway point in the sipe depth direction, and is inclined to the other side in the blade thickness direction relative to the mold radial direction from the halfway point in the sipe depth direction to the bottom of the sipe, each of the second offset portions is located between the first offset portions when viewed from above, when viewed from the side each of the second offset portions extends in parallel with the mold radial direction from the point closer to the position of a tire tread surface in the original state to the halfway point in the sipe depth direction, and extends with an incline to the other side in the blade thickness direction relative to the mold radial direction, from the halfway point in the sipe depth direction to the bottom of the sipe, wherein, based on the shapes of the first offset portions and the second offset portions, a blade path length (M2) at a position located inside the tire tread surface in the mold radial direction is set to be maximum value at the bottom of the sipe, and for each blade, a blade length (L2) at a position on an inner side, in the mold radial direction, of a position corresponding to a tire tread surface is set to be substantially the same as a blade length (L1) at the position corresponding to the tire tread surface, and a blade path length (M2) at the position on an inner side, in the mold radial direction, of a position corresponding to a tire tread surface is set to be larger than a blade path length (M1) at the position corresponding to the tire tread surface.

8. The tire curing mold according to claim 7, wherein the maximum value of the blade path length (M2) at a position located inside the tire tread surface in the mold radial direction is set to be 110% to 150% of the blade path length (M1) at the position corresponding to the tire tread surface.

9. The tire curing mold according to claim 7, wherein each of the blades is formed so that some portions of the blade at positions located inside the tire tread surface in the mold radial direction extend in parallel with the blade at the position corresponding to the tire tread surface when viewed in a plan view, and a total length (P2) of the parallel portions is set to be 20% to 80% of the blade length (L1) at the position corresponding to the tire tread surface.

* * * * *